United States Patent

Piccione

[15] 3,659,081
[45] Apr. 25, 1972

[54] JAMMED PAPER DETECTOR

[72] Inventor: Sebastian W. Piccione, 3026 Sheffield Drive, Plymouth Valley, Norristown, Pa. 19403

[22] Filed: May 3, 1971

[21] Appl. No.: 141,063

Related U.S. Application Data

[63] Continuation of Ser. No. 751,256, Aug. 8, 1968, abandoned.

[52] U.S. Cl. .......... 235/92 PE, 235/92 R, 235/92 V, 235/92 DP, 226/25, 197/133, 73/157, 340/260
[51] Int. Cl. .................. G06m 3/12, H03k 21/36
[58] Field of Search ........ 235/92 SB, 92 PE, 92 V, 92 DP; 226/11, 25; 250/219 DF; 197/133; 178/42; 73/157; 340/259, 260; 356/200

[56] References Cited

UNITED STATES PATENTS

| | | | |
|---|---|---|---|
| 2,699,676 | 1/1955 | Grunwald et al. | 73/157 |
| 2,994,783 | 8/1961 | Looschen | 250/219 |
| 3,139,521 | 6/1964 | Johnson | 235/92 |
| 3,251,039 | 5/1966 | Dupy et al. | 235/92 DP |
| 3,276,253 | 10/1966 | West et al. | 73/157 |
| 3,316,411 | 4/1967 | Linderman | 250/219 |
| 3,323,700 | 6/1967 | Epstein et al. | 197/133 X |
| 3,370,286 | 2/1968 | Buss | 340/259 |
| 2,628,556 | 2/1953 | Fay | 340/259 |

Primary Examiner—Thomas A. Robinson
Assistant Examiner—Joseph M. Thesz, Jr.

[57] ABSTRACT

This invention pertains to a paper jam prevention scheme. In order to detect the jamming of a moving record medium which operates at a relatively high speed, the motion of the paper is detected such that for each line of pring or interline spacing a pulse is generated. These pulses are counted whereby upon the generation of a predetermined number of printed lines or spaces on the moving record medium, a clear signal is generated by a device which actually senses paper motion. This last mentioned signal clears the counter and causes the latter to re-cycle and signifies a proper operation of the paper feed. When no clear signal is generated as a result of the paper being jammed or torn, the counter continues to count to a predetermined number whereupon a halt signal is generated.

7 Claims, 2 Drawing Figures

INVENTOR
SEBASTIAN W. PICCIONE

BY  Rene A. Kuypers
ATTORNEY

JAMMED PAPER DETECTOR

This application is a continuation of Ser. No. 751,256, filed Aug. 8, 1968, now abandoned.

BACKGROUND OF THE INVENTION

This invention relates in general to a jammed paper detection scheme and in particular relates to such a device for use with a high speed printer employed in conjunction with a computer device.

Presently known prior art detection schemes for determining that moving paper for use with high speed printers is not working properly have not been entirely satisfactory. Present day detection schemes use paper wipers and switches which are not foolproof in that they allow errors such as paper jams or paper torn at the sprockets to pass undetected since the paper need only be present under the sensing device (i.e., the wiper) and "not" moving to indicate proper operation. In other words, the present state of the art devices although they may satisfactorily detect that paper is no longer present in the machine, nevertheless, they do not satisfactorily detect other more serious malfunctions, such as paper jams.

Therefore, there is a great need for the instant invention since printer devices used with digital computers are operating at higher and higher speeds. This results from the fact that as computer speeds are increasing it is necessary that the instrument for recording the results of the computations also increase. Hence, the need for a scheme to prevent a loss of information in the event that the printer device is jammed or the paper is torn, etc. is readily apparent.

The above-discussed problem becomes particularly acute in unattended type of operation such as a communication link terminal wherein information at a computer center is transmitted over telephone lines to remote location whereat a printer may be located to record the computed information. In this particular situation, since an operator may not be present to detect a malfunction, a considerable period of time may elapse and therefore much information may be lost before the malfunction or paper jam is detected and corrected.

The above therefore sets forth the present need for a device herein provided.

SUMMARY OF THE INVENTION

The present invention provides that for each supposed line of printing or paper space a pulse is generated. These pulses are fed into a counter device. After a certain predetermined number of lines have been printed or spaced and a corresponding number of pulses have been generated comprising a cycle, a clear pulse is generated by a device which senses actual paper motion. This latter mentioned pulse provides a signal to the counting device after the predetermined number of pulses have been entered and is generated after each perforation along the side of the paper passes a designated point. This type of operation indicates that the high speed printer is in a non-jammed condition and is working properly.

On the other hand, if no clear signal is entered into the counter after the required number of pulses have been counted additional input pulses will continue to step the counter. When the counter counts beyond a predetermined number there is an indication that there is a malfunction of the paper feed (i.e., jammed paper or torn paper) and a signal is provided to terminate the operation.

Accordingly, it is an object of this invention to provide a new jammed paper detector scheme.

It is yet another object of this invention to provide a new and improved jammed paper detector arrangement for use with a high speed printer used in conjunction with a computer.

DESCRIPTION OF THE PREFERRED EMBODIMENTS

Figure 1:
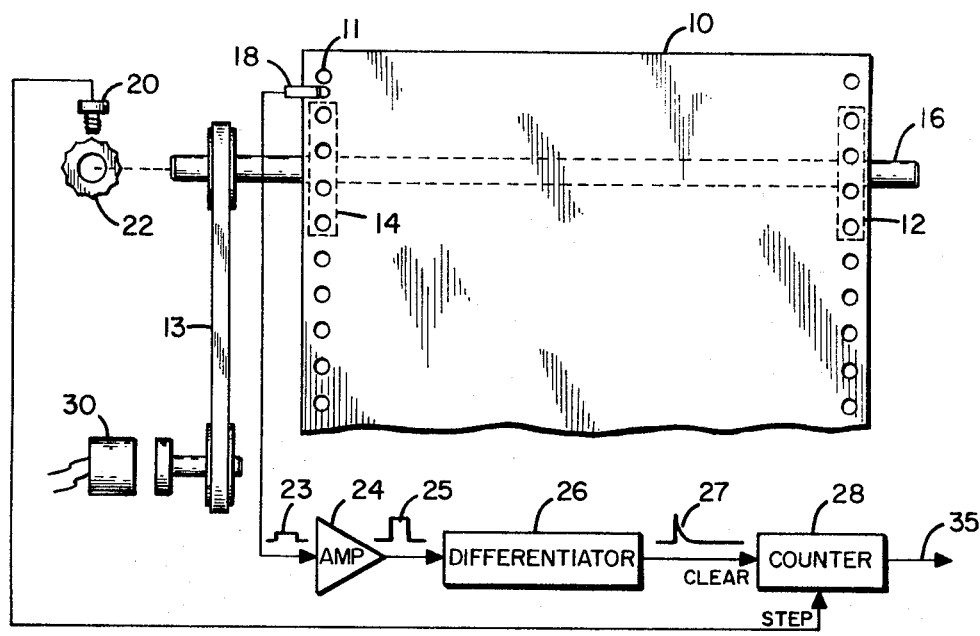
FIG. 1 depicts in schematic form the arrangement of the instant invention.

Referring now to FIG. 1, there is depicted in schematic form the essential elements of the paper feed mechanism used in a high speed printer and the associated paper jam detector. Details have been kept to a minimum in order to simplify the description. The paper 10 rests on two tractors 12 and 14 which include sprocket wheels whose teeth are inserted into the holes of the paper 11. The shaft 16 rotates the sprocket wheels in a clockwise direction as viewed from the right hand side of the paper so that the paper moves in an upward direction. Shaft 16 is rotated clockwise by means of the drive belt 13 which is in turn rotated by the motor and clutch assembly 30.

Figure 2:
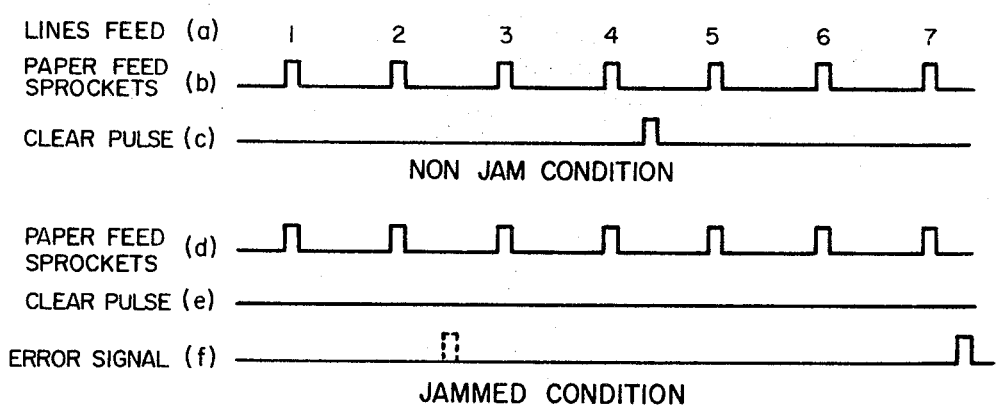
FIG. 2 depicts pulses generated during the operation of FIG. 1.

Oriented along the side of the paper whereat the holes 11 are located is a photocell 18. The photocell is located above the line being printed and is arranged to detect the variations of light intensity between the opaque portion of the paper between the holes 11 and the light (not shown) which shines through the holes. The print hammers are not depicted since their operation is not pertinent to the invention. THe output of the photocell 18 is directed into the amplifier 24. An additional pulse source is provided by means of the gear 22 which rotates in conjunction with the shaft 16. As the gear 22 rotates in conjunction with the shaft 16, a variable reluctance pick-up 20 which is juxtaposed to the former causes a pulse to be generated every time a tooth is opposite pick-up 20. In brief, a variable reluctance pick-up may comprise, as an example, a permanent magnet around which is positioned pole pieces arranged to have an air gap at their tips. A coil is wound around the assembly. As the gear 22 rotates so that the space between two consecutive gear teeth are juxtaposed to the pick-up 20, the reluctance of the circuit increases. However, when the gear 22 moves so that a tooth is directly opposite the pick-up, the reluctance decreases and there is a change in magnetic flux in the assembly circuit. This causes a pulse to be induced in the output terminals of the winding. The pulses emanating from the reluctance pick-up comprises the paper feed sprocket signals and provides a signal for every line that is printed or spaced. For example, in a typical print mode of eight lines per inch and with a half-inch between consecutive sprocket holes 11, four lines of print and therefore four sprocket pulses are generated for every change of light induced in the photocell by the sprocket holes 11. The four sprocket pulses emanating from the variable reluctance pick-up 20 are fed into the input terminal of the counter device 28. Referring now briefly to FIG. 2a, the arabic numbers indicate the print lines and directly under each number as shown in FIG. 2b there is a paper feed sprocket signal. The counter 28 comprises well known equipment which is designed to count to a predetermined number (e.g., 5) after which a stop signal is generated. The counter 28 is further designed to be reset at any number in the count cycle.

Since the paper fed arrangement has been designated as eight lines to the inch or four lines to the one-half inch (i.e., one half inch between consecutive perforations 11) it is apparent that the photocell 18 will detect a transition from darkness to light after it passes over a perforation 11 or after the fourth sprocket pulse corresponding to the fourth line of print generating the clear pulse shown in FIG. 2c.

As previously mentioned, the light transition signal detected by the photocell 18 is fed into the amplifier 24. The amplified signal 25 is then fed into the differentiator 26. The differentiator 26 is a circuit whose output voltage is proportioned to the rate of change of an input voltage or current as shown by the signal 27. THe signal 27 is then directed into the clear terminal of the counter 28 which returns the latter to the zero or re-cycle condition.

In summary, the instant invention provides that using, for example, a print mode of eight lines per inch or four lines per one-half inch (i.e., the distance between two consecutive holes 11), four sprocket pulses are generated after which a clear pulse is generated which returns the counter to zero so that it can again count another group of four pulses. When the instant invention is operating in this mode it is in a non-jammed condition and the operation is deemed satisfactory.

Let us now assume that the paper 10 is in a jammed condition. In this type of malfunction, the shaft 16 continues to rotate as does the gear 22. Also, the variable reluctance pick-up 20 continues to produce paper feed sprocket signals as shown in FIG. 2d. However, because the paper 10 is jammed due to the above-mentioned malfunction the perforations 11 do not pass by the photocell 18 and hence, the latter does not detect any transition from darkness to light. As a result, the signal 23 fed into the amplifier 24 by the photocell 18 is at a continuous low (or high) level and continues at a low (or high) level when it enters the differentiator 26. Therefore no clear signal is produced to reset the counter 28 as shown in FIG. 2d. The result is that paper feed sprocket signals continue to be fed into the counter 28. As previously mentioned, the counter 28 is so designed that it will only count to a predetermined number such as 5. In the event that the counter 28 reaches the count of 5 it is an indication that a jammed condition exists and an output signal (FIG. 2f) is produced at the output terminal 35 (FIG. 1). This output signal is fed back into the input circuitry of the motor and clutch assembly 30 and causes the motor to stop operating. Hence, there is no further power transfer through the drive belt 13 and no further rotation of the shaft 16 as well as the sprockets of the tractors 12 and 14. The termination signal may also be utilized to prevent the loss of information by preventing any further print out of information so that the latter is not lost. Therefore it can be seen that upon the detection of a jammed condition the mechanism causing the paper to feed through the printer is terminated and hence there is minimum waste of paper and minimum (five lines) loss of information.

Assume now another malfunction whereby the paper is torn along the perforations 11 of paper 10 so that light directly impinges upon the photocell 18. Under this condition, the input 23 to the amplifier 24 moves from a low level and remains at a high level. Therefore, the signal 25 into the differentiator 26 also remains at a high level. Since the differentiator 26 only produces an output where there is a transition or rate of change of the input signal 25, only one output signal will be produced despite the time duration of the input signal. This lack of an output signal terminates the operation of the printer as above described.

As an example of the above-discussed operation, assume that the clear pulse 27 (see FIG. 2e) is generated after the second pulse in FIG. 2d. The clear pulse 27 is generated by the fact that the paper has been torn after the second paper sprocket pulse and a high input signal 23 is thereby produced. It should be realized that this clear signal is generated out of turn since if it had been operating properly, it would have been generated at the end of the fourth pulse. The counter 28 will then begin counting again from the third to the seventh pulse (five pulses). Since no clear signal is generated by the differentiator 26 at the sixth pulse (four pulses later) because the input 25 is still in a high state and an output signal is produced only when there is a transition or a rate of change, a stop signal (see FIG. 2f) is generated. This error signal which is produced at the output terminal 35 of the counter 28 causes the motor and clutch 30 to terminate its operation and further causes the computer to stop producing information for printing on the paper 10.

The instant invention has been described with respect to a motion detector which comprises the photocell 18. It should be apparent to those skilled in the art that other motion detector schemes might be readily used. As one example, instead of the photocell 18 a similar arrangement to the gear 22 used in conjunction with a variable reluctance pick-up can be utilized. In such an arrangement the variable reluctance pick-up would be positioned substantially at the position of the photocell 18. When a sprocket gear, which is driven by the holes of the paper 11, passes the pick-up, a pulse would be generated which in turn would be fed into the amplifier 24 and the differentiator 26. Aside from this aspect, the invention would operate substantially in a manner above described.

It should further be noted that the invention has been described with an operating scheme which provides eight lines of print per inch. It should be realized that variations of this mode can be utilized such for example as six lines per inch and that the invention can be readily modified to accommodate this change.

What is claimed is:

1. The printing arrangement comprising:
    a. a paper recording medium having equally spaced locating means,
    b. means for moving said medium in an advancing incremental step every time a line of print is formed;
    c. means for generating first signals for each incremental step that said means for moving causes said recording medium to advance;
    d. means for generating a second signal each time said locating means passes a fixed reference point;
    e. means for counting said first signals up to a first predetermined number,
        said last mentioned means being reset to zero by said second signal after reaching a second predetermined number,
        said first predetermined number being greater than said second predetermined number;
    f. means for producing an error signal after said counting means reaches said first predetermined number,
        said error signal causing said moving means to terminate.

2. The combination in accordance with claim 1 wherein said means for generating said first signal for each incremental movement comprises a transducer means.

3. The combination in accordance with claim 2 wherein said transducer means is used in conjunction with a sprocket wheel.

4. The combination in accordance with claim 1 wherein the means for generating a second signal comprises a photocell means.

5. The combination in accordance with claim 4 wherein the means for generating a second signal further comprises equally spaced perforations along the side of said recording medium through which light rays shine through.

6. The combination in accordance with claim 1 wherein said generated second signal is directed into a differentiator.

7. The combination in accordance with claim 1 wherein the ratio of first to second signals is approximately four to one.

* * * * *